United States Patent
Luo et al.

(10) Patent No.: US 10,341,522 B2
(45) Date of Patent: Jul. 2, 2019

(54) IMAGE CAPTURE AND OUTPUT METHOD

(71) Applicant: Teco Image Systems Co., Ltd., Taipei (TW)

(72) Inventors: Nai-Wun Luo, Taipei (TW); Cheng-Yuan Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 0 days.

(21) Appl. No.: 15/843,502

(22) Filed: Dec. 15, 2017

(65) Prior Publication Data

US 2019/0158694 A1    May 23, 2019

(30) Foreign Application Priority Data

Nov. 22, 2017   (TW) .............. 106140572 A

(51) Int. Cl.
| | | |
|---|---|---|
| *H04N 1/00* | (2006.01) | |
| *H04N 1/047* | (2006.01) | |
| *H04N 5/369* | (2011.01) | |
| *H04N 1/32* | (2006.01) | |
| *H04N 1/191* | (2006.01) | |
| *G06F 3/0354* | (2013.01) | |

(52) U.S. Cl.
CPC ......... *H04N 1/047* (2013.01); *G06F 3/03543* (2013.01); *H04N 1/00204* (2013.01); *H04N 1/1911* (2013.01); *H04N 1/32358* (2013.01); *H04N 5/3692* (2013.01); *H04N 2201/0081* (2013.01); *H04N 2201/0096* (2013.01)

(58) Field of Classification Search
CPC ......... G06F 2203/04106; G06F 3/0488; G06F 2203/04104; G06F 3/0346; G06F 3/0412; G06F 3/0418; G06F 3/04817; G06F 3/04842; G06F 3/0485
USPC ....... 382/106, 286; 348/E5.024, 169, 333.08
See application file for complete search history.

(56) References Cited

U.S. PATENT DOCUMENTS

| | | |
|---|---|---|
| 5,355,146 A | 10/1994 | Chiu et al. |
| 6,556,315 B1 | 4/2003 | Kommrusch et al. |
| 7,738,004 B2 | 6/2010 | Park et al. |

(Continued)

FOREIGN PATENT DOCUMENTS

| | | |
|---|---|---|
| CN | 103905686 A | 7/2014 |
| EP | 2254325 A | 5/2010 |

(Continued)

*Primary Examiner* — Negussie Worku
(74) *Attorney, Agent, or Firm* — Kirton McConkie; Evan R. Witt

(57) ABSTRACT

An image capture and output method comprises steps of providing an image capture device, continuously capturing a plurality of line images from an initial position and recording a position information corresponded to each line image, calculating the difference between the position information of the first line image and the initial position and the differences between the position information of each of the rest line images and a former one of the line image to obtain a fill information, filling each line image into an image buffer according to the fill information, and outputting the image buffer as a product image. Therefore, the deformation issue is effectively solved, the storage memory is saved, and the manufacturing cost is lowered.

5 Claims, 8 Drawing Sheets

(56) References Cited

U.S. PATENT DOCUMENTS

| | | | |
|---|---|---|---|
| 8,593,522 B2* | 11/2013 | Ishii | G02B 27/646 |
| | | | 348/169 |
| 8,624,998 B2* | 1/2014 | James | H04N 5/23248 |
| | | | 348/231.2 |
| 9,319,589 B2* | 4/2016 | Kosaka | H04N 5/23216 |
| 9,871,931 B1* | 1/2018 | Luo | H04N 1/00013 |
| 10,055,011 B2* | 8/2018 | Yang | G06K 9/00221 |
| 2002/0114022 A1 | 8/2002 | Tanaka et al. | |
| 2015/0381883 A1* | 12/2015 | Kawai | H04N 5/23293 |
| | | | 348/333.08 |
| 2016/0225133 A1* | 8/2016 | Yang | G06K 9/00221 |
| 2017/0111538 A1* | 4/2017 | Luo | H04N 1/00384 |
| 2017/0155899 A1 | 6/2017 | Lin | |
| 2018/0284966 A1* | 10/2018 | Irie | G03B 15/00 |

FOREIGN PATENT DOCUMENTS

| | | |
|---|---|---|
| EP | 3322172 A1 | 12/2016 |
| TW | 201101806 A | 1/2011 |
| TW | 201514968 A | 4/2015 |

\* cited by examiner

IMAGE CAPTURE AND OUTPUT METHOD

CROSS-REFERENCE TO RELATED APPLICATION

This application claims priority from Taiwan Patent Application No. 106140572, filed on Nov. 22, 2017, the entire contents of which are incorporated herein by reference for all purposes.

FIELD OF THE INVENTION

The present invention relates to an image capture method, and more particularly to an image capture and output method reducing the image deformation and saving the memory.

BACKGROUND OF THE INVENTION

A handheld image capture device (e.g. a handheld scanner) is usually applied as the image capture tool of the document digitalization. The handheld image capture device is held by a user for capturing a document as an image along a direction, so a tilt may occur during operation. Meanwhile, only one direction can be operated along makes a lot of limitations.

To solve issues mentioned above, some image capture and output method are developed in the art. For example, please refer to FIG. 1A and FIG. 1B. FIG. 1A schematically illustrates a temporary buffer captured by an image capture and output method of prior art. FIG. 1B schematically illustrates an output buffer that is going to be outputted by the image capture and output method of prior art. As shown in FIG. 1A and FIG. 1B, when performing an image capture through an image capture and output method of prior art, the image is continuously captured and stored into a plurality of temporary image positions in a temporary buffer as shown in FIG. 1A, the movement information are recorded simultaneously, an algorithm is utilized to decide the accessed image, and the accessed image is outputted to an output buffer as an output image. In FIG. 1B, if a temporary image position corresponded to an accessed image shown in FIG. 1A is empty, a blank image will be outputted to the output buffer, and the output buffer shown in FIG. 1B is outputted as a final product image.

However, when the movement path of the handheld image capture device is a curve, the original image in the temporary buffer will be bent or even be deformed. Under these circumstances, the image capture and output method of prior art mentioned above cannot be used to pick the correct accessed image. Moreover, under the structure of the image capture and output method of prior art, a temporary buffer and an output buffer are necessary. A very large amount of storage memory will be occupied, so that the manufacturing cost cannot be effectively reduced.

Therefore, there is a need of providing an improved image capture and output method distinct from the prior art in order to solve the above drawbacks.

SUMMARY OF THE INVENTION

Some embodiments of the present invention are to provide an image capture and output method in order to overcome at least one of the above-mentioned drawbacks encountered by the prior arts.

The present invention provides an image capture and output method. By recording the position information of each line image, calculating to obtain the fill information, directly filling each line image into the image buffer, and directly outputting the image buffer as the product image, the deformation issue is effectively solved, the storage memory is saved, and the manufacturing cost is lowered.

The present invention also provides an image capture and output method. The line images are repeatedly filled into the corresponded image position of the image buffer and the following rows of the image positions, so that the image can be quickly fixed without consuming extra performances.

In accordance with an aspect of the present invention, there is provided an image capture and output method. The image capture and output method comprises steps of providing an image capture device, continuously capturing a plurality of line images from an initial position and recording a position information corresponded to each line image, calculating the difference between the position information of the first line image and the initial position and the differences between the position information of each of the rest line images and a former one of the line image to obtain a fill information, filling each line image into an image buffer according to the fill information, and outputting the image buffer as a product image.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
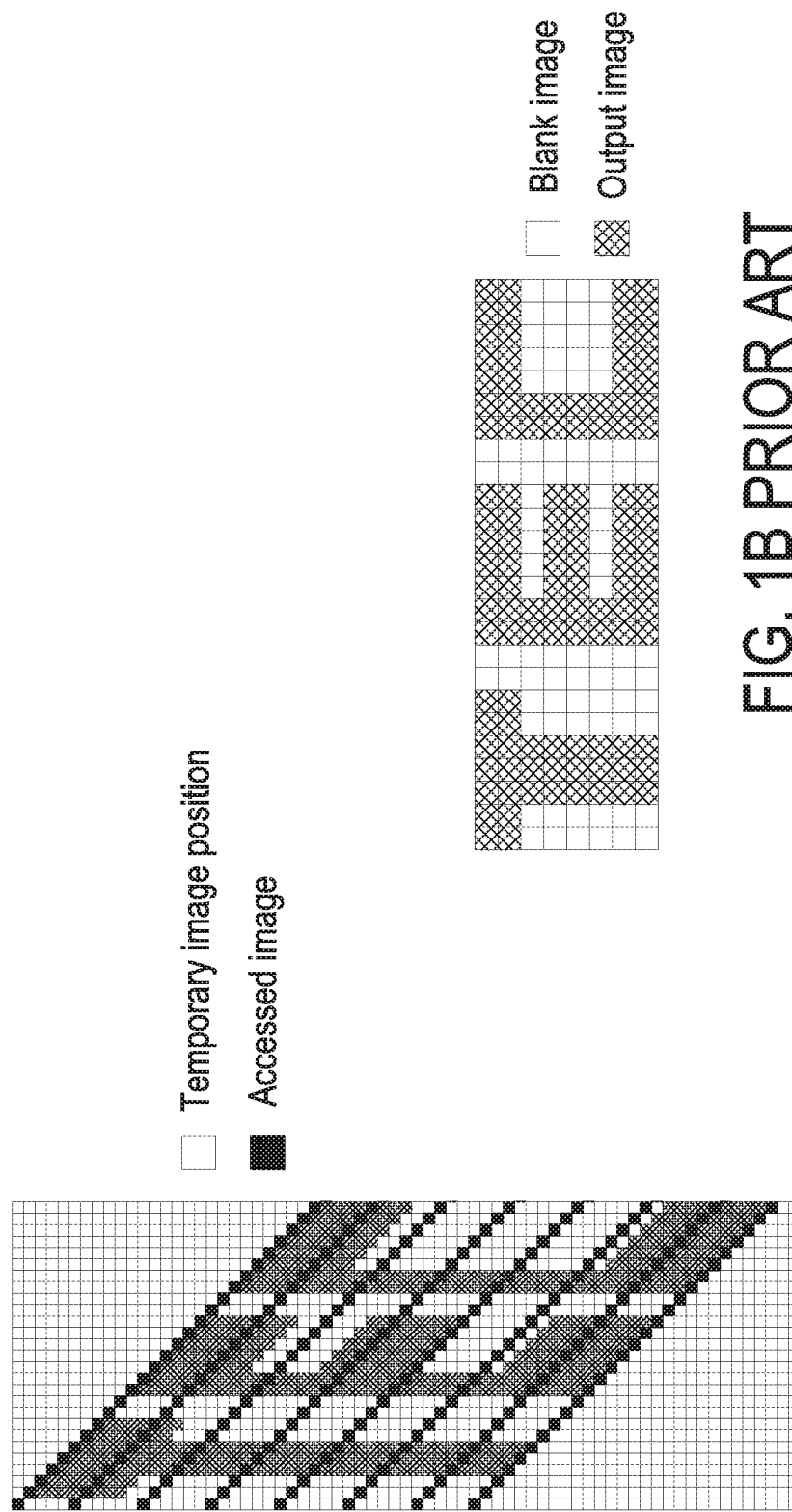
FIG. 1A schematically illustrates a temporary buffer captured by an image capture and output method of prior art.
FIG. 1B schematically illustrates an output buffer that is going to be outputted by the image capture and output method of prior art.
Figure 2:
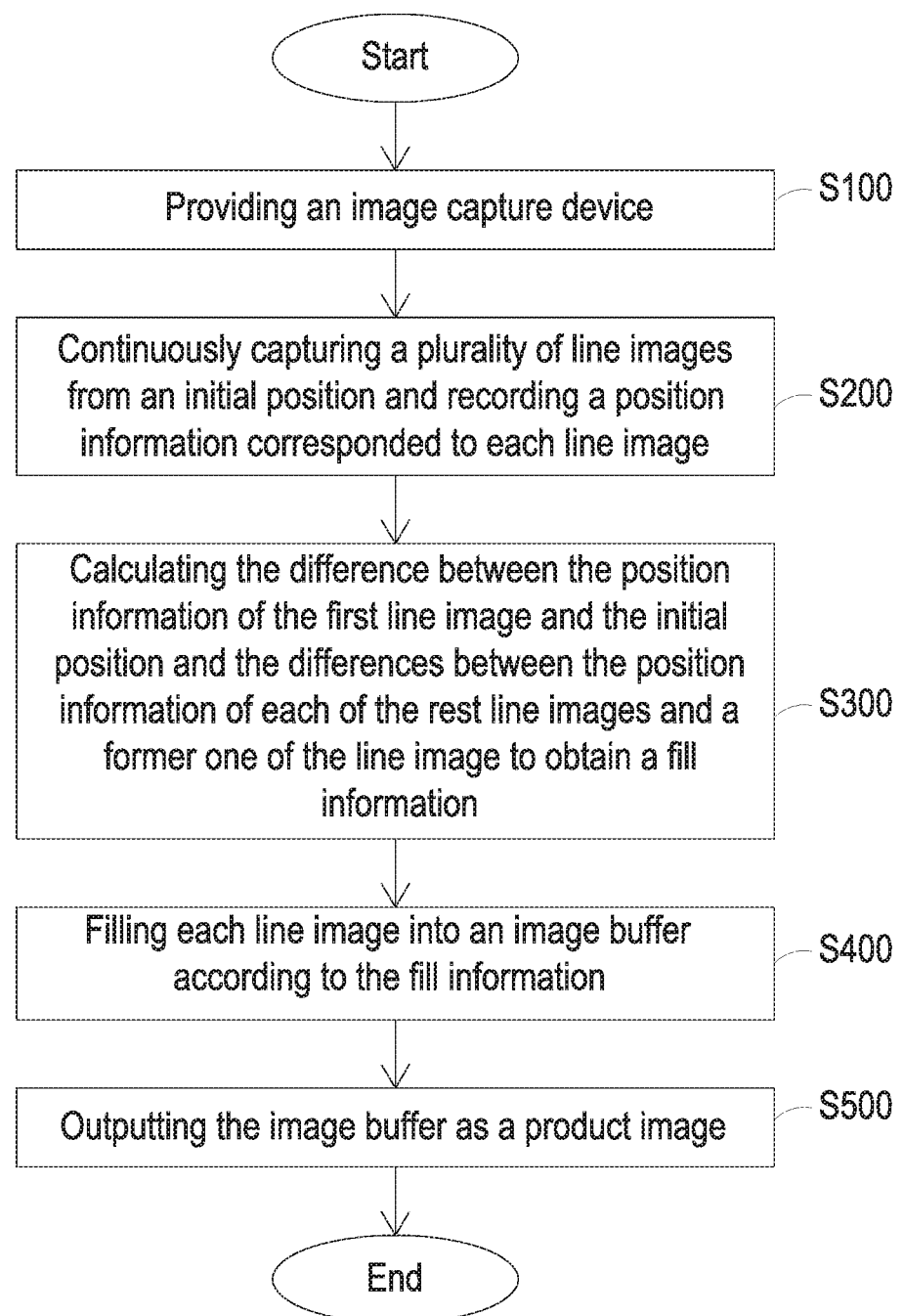
FIG. 2 schematically illustrates the flow chart of an image capture and output method according to an embodiment of the present invention.
Figure 3:
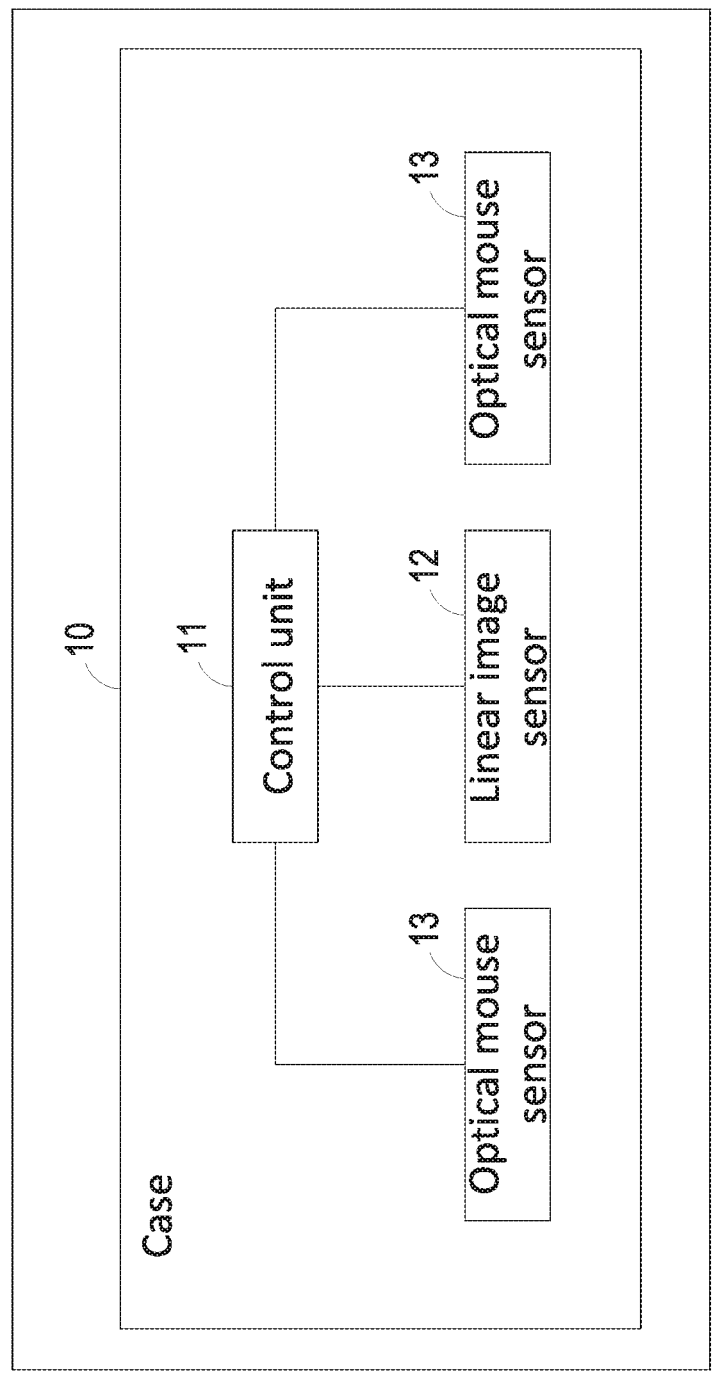
FIG. 3 schematically illustrates the block diagram of an image capture device applied to an image capture and output method according to an embodiment of the present invention.

Please refer to FIG. 2 and FIG. 3. FIG. 2 schematically illustrates the flow chart of an image capture and output method according to an embodiment of the present invention. FIG. 3 schematically illustrates the block diagram of an image capture device applied to an image capture and output method according to an embodiment of the present invention. As shown in FIG. 2 and FIG. 3, an image capture and output method according to an embodiment of the present invention comprises steps as following. Firstly, as shown in step S100, providing an image capture device 1. Next, as shown in step S200, continuously capturing a plurality of line images from an initial position and recording a position information corresponded to each line image. Then, as shown in step S300, calculating the difference between the position information of the first line image and the initial position and the differences between the position information of each of the rest line images and a former one of the line image to obtain a fill information. The fill information is the calculated result of the step S300. How to apply the fill information depends on the demands and the specification of the image capture device 1 and will be set to meet the requirement of applications. Next, as shown in step S400, filling each line image into an image buffer according to the fill information. Finally, outputting the image buffer as a product image as shown in step S500. In brief, by recording the position information of each line image, calculating to obtain the fill information, directly filling each line image into the image buffer, and directly outputting the image buffer as the product image, the deformation issue is effectively solved, the storage memory is saved, and the manufacturing cost is lowered.

In some embodiments, the image capture device 1 is preferred to comprise a case 10, a control unit 11, a linear image sensor 12 and two optical mouse sensors 13, but not limited herein. The control unit 11, the linear image sensor 12 and the two optical mouse sensors 13 are disposed in the case 10. The linear image sensor 12 and the two optical mouse sensors 13 are respectively connected with the control unit 11. The two optical mouse sensors 13 are respectively disposed at two opposed sides of the linear image sensor 12 for recording the position information of the two opposed sides (i.e. left side and right side) of each line image while the linear image sensor is capturing line images. Under this configuration, the step S200 of the embodiment mentioned above is preferred to be implemented by the linear image sensor 12 and the two optical mouse sensors 13, the step S300 through the step S500 are preferred to be implemented by the control unit 11, and the control unit 11 is preferred to be a processor or a microcontroller, but not limited thereto.

In some embodiments, the position information shown in the step S200 comprise two coordinate positions (i.e. the coordinates of left side and right side) of the two opposed sides of the line image captured by the two optical mouse sensors 13. Certainly, the two coordinate positions can be presented as two-dimensional coordinates like (X1, Y1) and (X2, Y2), or can be presented as polar coordinates or latitude and longitude, which are within the scope of teachings of the present invention.

Figure 4:
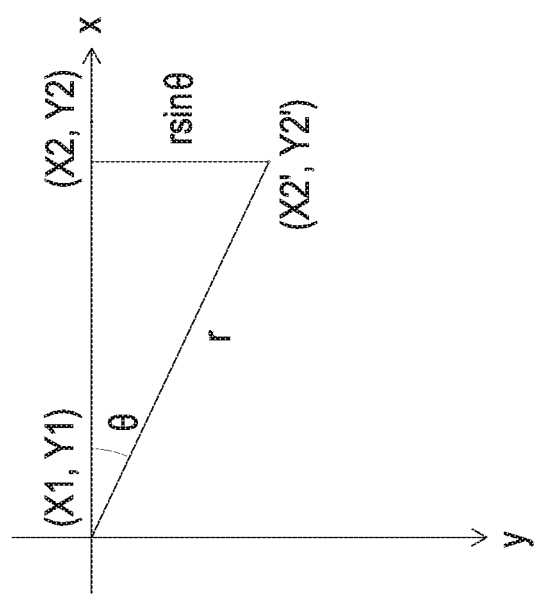
FIG. 4 schematically illustrates the relations of the trigonometric function utilized by the image capture and output method of the present invention.

Furthermore, the position information further comprise a shift degree. Please refer to FIG. 2, FIG. 3 and FIG. 4. FIG. 4 schematically illustrates the relations of the trigonometric function utilized by the image capture and output method of the present invention. As shown in FIG. 2 through FIG. 4, the shift degree is a degree of the angle between the first line image and the initial position, or a degree of the angle between each of the rest line images and a former one of the line image. For example, if the coordinates of the two optical mouse sensors 13 at the initial position are respectively (X1, Y1) and (X2, Y2), and the two coordinates of the two opposed sides of the first line image are (X1, Y1) and (X2', Y2'), assuming the length of the case 10 of the image capture device 1 as "r", the shift degree of the angle θ can be obtained through the trigonometric function, which is given by:

$$\theta = \arcsin\left(\frac{|Y2' - Y2|}{r}\right).$$

Figure 5A:
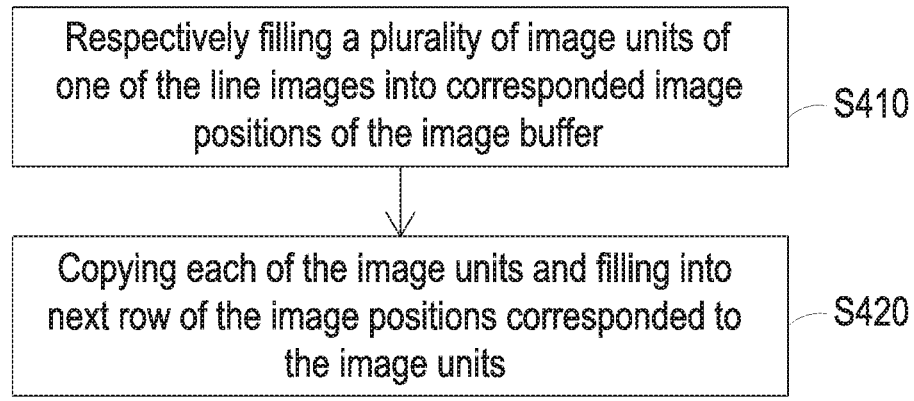
FIG. 5A schematically illustrates the detailed flow chart of the step S400 shown in FIG. 2 according to an embodiment of the present invention.
Figure 5B:
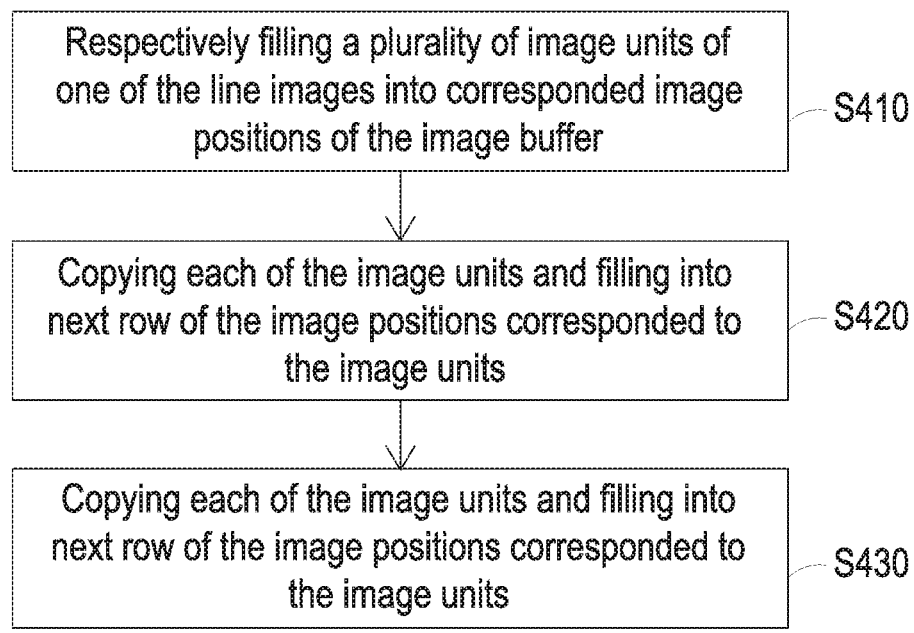
FIG. 5B schematically illustrates the detailed flow chart of the step S400 shown in FIG. 2 according to another embodiment of the present invention.

In some embodiments, when the shift angle θ does exist, the step S400 of the image capture and output method further comprises detailed steps as following, so that the dot compensation will be performed and the image will be completed. Please refer to FIG. 2, FIG. 5A and FIG. 5B. FIG. 5A schematically illustrates the detailed flow chart of the step S400 shown in FIG. 2 according to an embodiment of the present invention. FIG. 5B schematically illustrates the detailed flow chart of the step S400 shown in FIG. 2 according to another embodiment of the present invention. As shown in FIG. 2, FIG. 5A and FIG. 5B, when the shift angle does exist, the image filled in the image buffer is incomplete or discontinuous, hence the requirement of dot compensation becomes necessary. The step S400 and the detailed flow thereof are utilized for performing the image compensation. When the shift angle is smaller, for example the average of shift degrees is less than or equal to 15 degrees (each of the shift degrees is a degree of the angle between each line image and a former line image), the step S400 of the image capture and output method of the present invention comprises steps as following. Firstly, as shown in step S410, respectively filling a plurality of image units of one of the line images into corresponded image positions of the image buffer. Next, as shown in step S420, copying each of the image units and filling into next row of the image positions corresponded to the image units. In particular, the image units of each line image are filled into the image positions that they should be filled to, and the same image contents (i.e. the same image units) are filled into the next row. Certainly, the latter filled image will overwrite the previously filled image, so that the image compensation will be performed without affecting the original image to obtain the complete image, which is most close to the captured object.

On the other hand, when the average of shift degrees is greater than 10 degrees and less than or equal to 15 degrees, the step S400 of the image capture and output method of the present invention comprises steps as following. Firstly, as shown in step S410, respectively filling a plurality of image units of one of the line images into corresponded image positions of the image buffer. Next, as shown in step S420, copying each of the image units and filling into next row of the image positions corresponded to the image units. Then, the step S420 is re-performed, or a step S430 that is similar to the step S420 is performed. As shown in the step S430, copying each of the image units and filling into next row of the image positions corresponded to the image units. In other words, as the shift angle is larger, the number of rows to be compensated is larger, so one more row is utilized to implement the image compensation. In addition, when the shift angle is much larger, for example when the average of shift degrees is greater than 15 degrees, the step S410 is performed once and the step S420 is performed over three times to each line image. The step S420 can be totally performed for three times, four times, five times, six times, seven times, eight times, nine times or ten times, but not limited herein.

Figure 6:
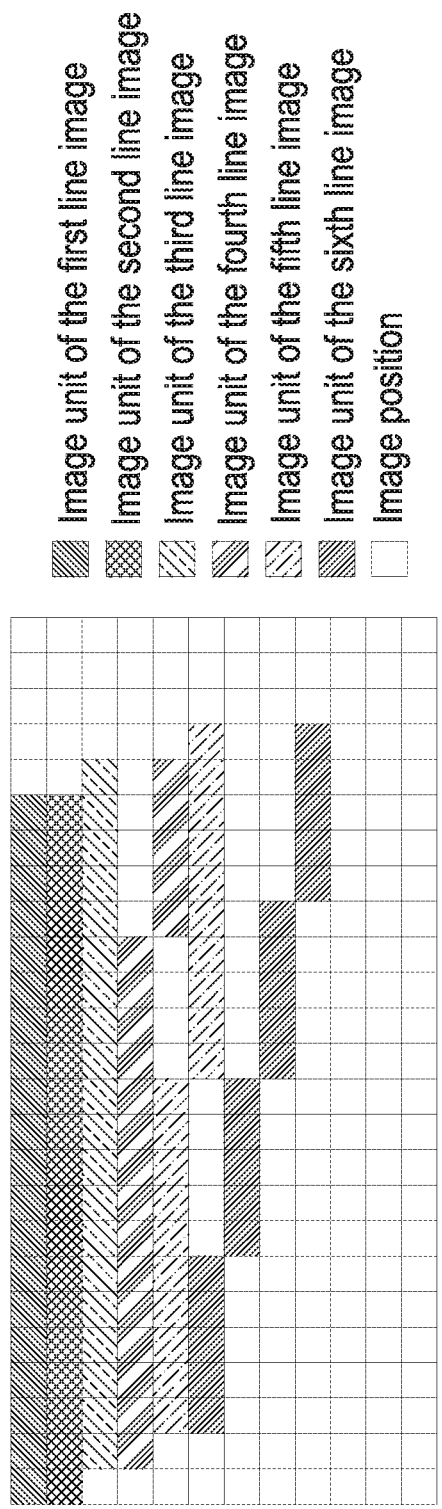
FIG. 6 schematically illustrates an image buffer that is going to be outputted by the image capture and output method of the present invention.
Figure 7A:
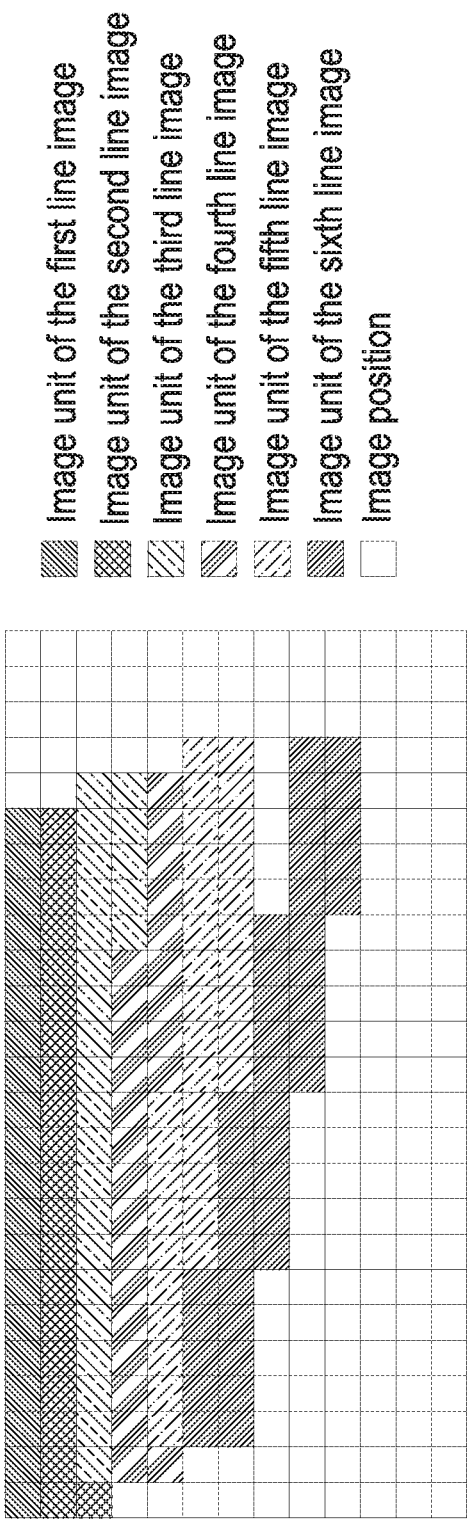
FIG. 7A schematically illustrates an image buffer that is going to be outputted by the image capture and output method of the present invention with the detailed flows shown in FIG. 5A.
Figure 7B:
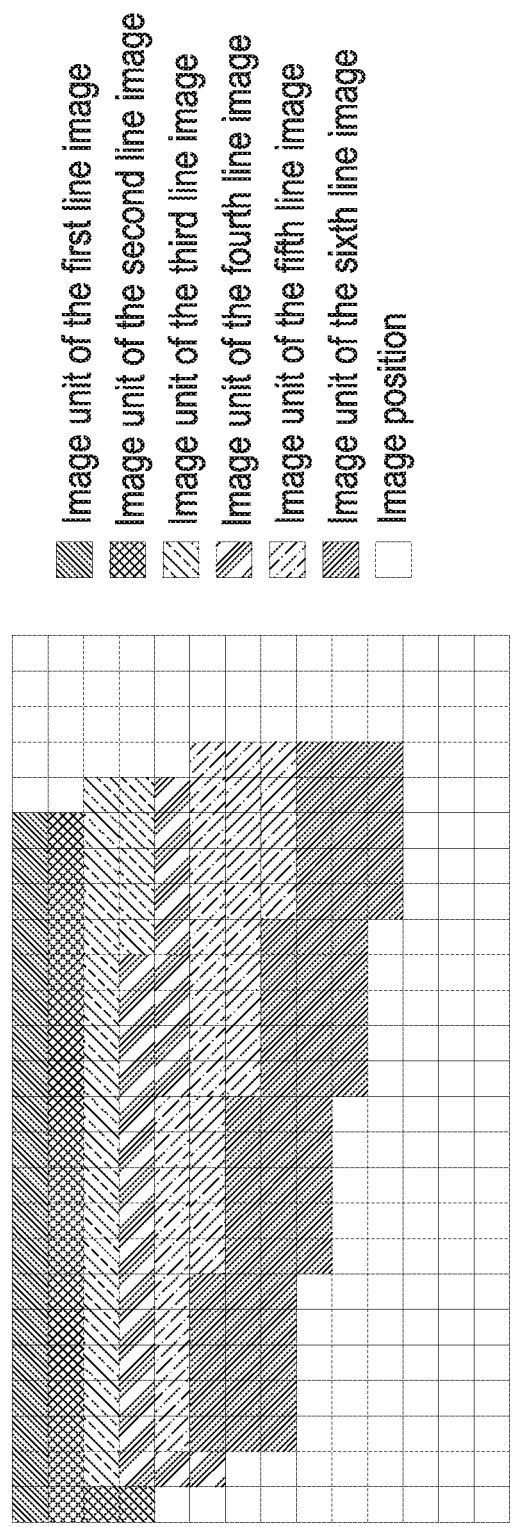
FIG. 7B schematically illustrates an image buffer that is going to be outputted by the image capture and output method of the present invention with the detailed flows shown in FIG. 5B.

Please refer to FIG. 6, FIG. 7A and FIG. 7B. FIG. 6 schematically illustrates an image buffer that is going to be outputted by the image capture and output method of the present invention. FIG. 7A schematically illustrates an image buffer that is going to be outputted by the image capture and output method of the present invention with the detailed flows shown in FIG. 5A. FIG. 7B schematically illustrates an image buffer that is going to be outputted by the image capture and output method of the present invention with the detailed flows shown in FIG. 5B. As shown in FIG. 6, FIG. 7A and FIG. 7B, in the image buffer, which is directly captured and outputted by the image capture and output method of the present invention, the first line image through the six line image and the plural blank image positions are exemplarily shown.

It can be seen from FIG. 6, if the image buffer is directly outputted as a product image, the image quality without image compensation is acceptable since there are not many blank image positions between the respective line images, which can achieve the rapid output and save the memory. If a one-row compensation is performed, the image buffer is shown in FIG. 7A, and only five blank image positions are between the fifth line image and the sixth line image. The image quality of the product image outputted from the image buffer shown in FIG. 7A is much higher than the product image outputted from the image buffer shown in FIG. 6. In order to make the product image perfect, an extra one-row compensation may be performed as shown in FIG. 7B. The blank image positions between each line image are no longer existed, which means the image is more complete. Therefore, besides the relationship of 10 degrees and 15 degrees and the image compensation therefor of the above-mentioned embodiments, the relationship between the shift degree and the amount of one-row compensation can be adjusted to meet the demands of users or meet the specification of the image capture device, but not limited herein.

From the above description, the present invention provides an image capture and output method. By recording the position information of each line image, calculating to obtain the fill information, directly filling each line image into the image buffer, and directly outputting the image buffer as the product image, the deformation issue is effectively solved, the storage memory is saved, and the manufacturing cost is lowered. Meanwhile, the line images are repeatedly filled into the corresponded image position of the image buffer and the following rows of the image positions, so that the image can be quickly fixed without consuming extra performances.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An image capture and output method, comprising steps of:
    (a) providing an image capture device, wherein the image capture device comprises a case, a control unit, a linear image sensor and two optical mouse sensors, the control unit is a processor or a microcontroller disposed in the case, the linear image sensor is disposed in the case and connected with the control unit, the two optical mouse sensors are disposed in the case and connected with the control unit, and the two optical mouse sensors are respectively disposed at two opposed sides of the linear image sensor;
    (b) continuously capturing a plurality of line images from an initial position and recording a position information corresponded to each line image, wherein the position information comprise two coordinate positions of the two opposed sides of the line image captured by the two optical mouse sensors, the position information further comprise a shift degree, and the shift degree is a degree of the angle between the first line image and the initial position, or a degree of the angle between each of the rest line images and a former one of the line image;
    (c) calculating the difference between the position information of the first line image and the initial position and the differences between the position information of each of the rest line images and a former one of the line image to obtain a fill information;
    (d) filling each line image into an image buffer according to the fill information wherein the step (d) further comprises steps of:
        (d1) respectively filling a plurality of image units of one of the line images into corresponded image positions of the image buffer; and
        (d2) copying each of the image units and filling into next row of the image positions corresponded to the image units; and
    (e) outputting the image buffer as a product image,
    wherein the step (b) is implemented by the linear image sensor and the two optical mouse sensors, the step (c), the step (d) and the step (e) are implemented by the control unit.

2. The image capture and output method according to claim 1, wherein the shift degree is calculated through the trigonometric function according to the coordinate positions and a length of the case.

3. The image capture and output method according to claim 1, wherein in the step (d), the step (d1) and the step (d2) are sequentially performed to each line image according to the sequence of the line images.

4. The image capture and output method according to claim 3, wherein in the step (d), the step (d1) is performed once and the step (d2) is performed twice to each line image.

5. The image capture and output method according to claim 3, wherein when the average of shift degrees is greater than 15 degrees, the step (d1) is performed once and the step (d2) is performed over three times to each line image, and wherein each of the shift degrees is a degree of the angle between each line image and a former line image.

\* \* \* \* \*